United States Patent
Fabbri

(10) Patent No.: US 6,959,504 B2
(45) Date of Patent: Nov. 1, 2005

(54) EMPTYING UNIT FOR RECOVERING BOTTOM RESIDUE, PARTICULARLY IN DRYING FILTERS, DRYING UNITS, AND THE LIKE

(75) Inventor: Luigi Fabbri, Brembate di Sopra (IT)

(73) Assignee: 3V Cogeim S.p.A., Milan (IT)

(*) Notice: Subject to any disclaimer, the term of this patent is extended or adjusted under 35 U.S.C. 154(b) by 168 days.

(21) Appl. No.: 10/171,666

(22) Filed: Jun. 17, 2002

(65) Prior Publication Data

US 2003/0000101 A1 Jan. 2, 2003

(30) Foreign Application Priority Data

Jun. 27, 2001 (IT) ...................................... MI2001A1351

(51) Int. Cl.[7] .................................................. F26B 7/00
(52) U.S. Cl. ............................. 34/380; 34/187; 34/179; 34/184; 34/241; 34/222
(58) Field of Search ........................... 34/201, 380, 187, 34/179, 76, 184, 241, 209, 210, 223, 218, 219, 222

(56) References Cited

U.S. PATENT DOCUMENTS

| | | | | |
|---|---|---|---|---|
| 4,157,281 A | * | 6/1979 | Burkhardt et al. ............ | 202/176 |
| 4,912,181 A | * | 3/1990 | Becket et al. ................. | 526/65 |
| 5,546,676 A | * | 8/1996 | Haleen ......................... | 34/187 |
| 5,564,350 A | * | 10/1996 | Peplinski ..................... | 110/344 |
| 5,813,801 A | | 9/1998 | Newbolt et al. | |
| 6,159,435 A | * | 12/2000 | Nguyen ......................... | 423/3 |
| 6,481,360 B1 | * | 11/2002 | Hume et al. ............ | 110/165 R |

FOREIGN PATENT DOCUMENTS

GB 1 562 592 3/1980

OTHER PUBLICATIONS

Patent Abstract of Japan vol. 1999, No. 02, Feb. 26, 1999—& JP 10 309972 A (Sanki Tsuuun KK), Nov. 24, 1998 *abstract*.

* cited by examiner

Primary Examiner—Cheryl J. Tyler
Assistant Examiner—Camtu Nguyen
(74) Attorney, Agent, or Firm—Guido Modiano; Albert Josif; Daniel O'Byrne

(57) ABSTRACT

An emptying unit for recovering bottom residue, particularly in drying filters, drying units and the like, comprising, inside a container for treating and containing dried product, fluid introducing elements for moving the bottom residue of the dried product. A discharge port being also provided which is controlled by a discharge valve interposed on a pneumatic circuit suitable to produce a circulation of fluid in output from the discharge port.

13 Claims, 4 Drawing Sheets

EMPTYING UNIT FOR RECOVERING BOTTOM RESIDUE, PARTICULARLY IN DRYING FILTERS, DRYING UNITS, AND THE LIKE

BACKGROUND OF THE INVENTION

The present invention relates to an emptying unit for recovering bottom residue, particularly in drying filters, drying units, and the like.

It is known that the drying filters and drying units used in many industrial fields generally comprise a vessel or container that is constituted by a hood-like body which is closed, in a lower region, by a bottom that is monolithic with said body or is hermetically coupled thereto and above which the separator filter may optionally be provided.

Inside the container there is usually an agitator, which after filtration and drying has ended allows the outward expulsion of the product by means of a hatch that generally opens at the lower lateral or bottom part.

To prevent the agitator from damaging the filtering element or by scraping the bottom, from introducing possible contaminant particles in the dried product, the agitator must strictly remain spaced from the filter and from the bottom; accordingly, with currently known solutions a bottom residue remains inside the container.

This bottom residue must be recovered for various reasons; to avoid insufficient separation of batches of two different qualities from a product treatment, the product obtained by a previous process must be fully removed and the apparatus must be cleaned correctly in order to remove the dried product entirely.

Another reason for which it is necessary to remove the so-called bottom residue is that the residue, which very often has a high economic value, can be spoiled by the subsequent batch being processed, with an evident economical loss.

Currently, to perform recovery it is necessary to take particular precautions, such as the use of glove boxes or other systems that require protection for the operator, for the environment and for the product and always have very high costs and considerable dimensions.

SUMMARY OF THE INVENTION

The aim of the present invention is to solve the above problems by providing an emptying unit for recovering bottom residue, particularly in drying filters, drying units and the like, that allows to remove completely the dried product and in particular the portion that remains between the lower level reached by the agitator and the filter or bottom of the container, without having to resort to complicated operations with considerable manual interventions.

Within this aim, a particular object of the invention is to provide an emptying unit that allows total recovery of the bottom residue without compromising in any way the quality of the resulting product and without creating any kind of contamination toward the environment.

Another object of the present invention is to provide an emptying unit which, by way of its particular constructive characteristics, is capable of giving the greatest assurances of reliability and safety in use.

Another object of the present invention is to provide an emptying unit for recovering bottom residue, particularly in drying filters, drying units and the like, that can be obtained easily starting from commonly commercially available elements and materials and is further competitive from a merely economical standpoint.

This aim and these and other objects that will become better apparent hereinafter are achieved by an emptying unit for recovering bottom residue, particularly in drying filters, drying units and the like, according to the invention, characterized in that it comprises, inside a container for treating and containing dried product, means for introducing a fluid for moving the bottom residue of the dried product, a discharge port being further provided which is controlled by a discharge valve interposed on a pneumatic circuit suitable to produce a circulation of fluid in output from said discharge port.

BRIEF DESCRIPTION OF THE DRAWINGS

Further characteristics and advantages of the invention will become better apparent from the following detailed description of some preferred but not exclusive embodiments of an emptying unit and method for recovering bottom residue, particularly in drying filters, drying units and the like, illustrated only by way of non-limitative example in the accompanying drawings, wherein.

DESCRIPTION OF THE PREFERRED EMBODIMENTS

Figure 1:
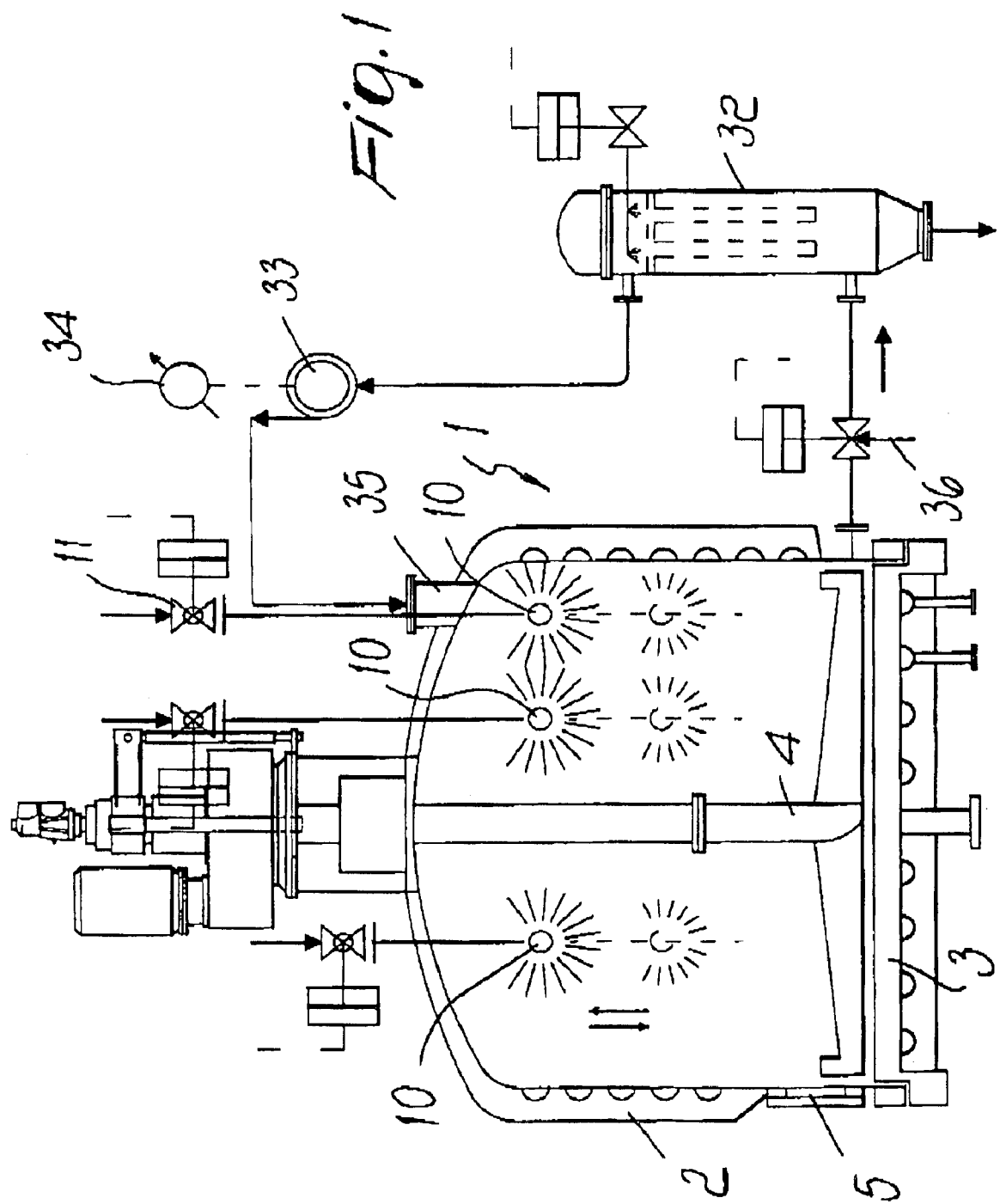
FIG. 1 is a view of the emptying unit in which the movement means are constituted by washing balls and/or rotating elements.
Figure 2:
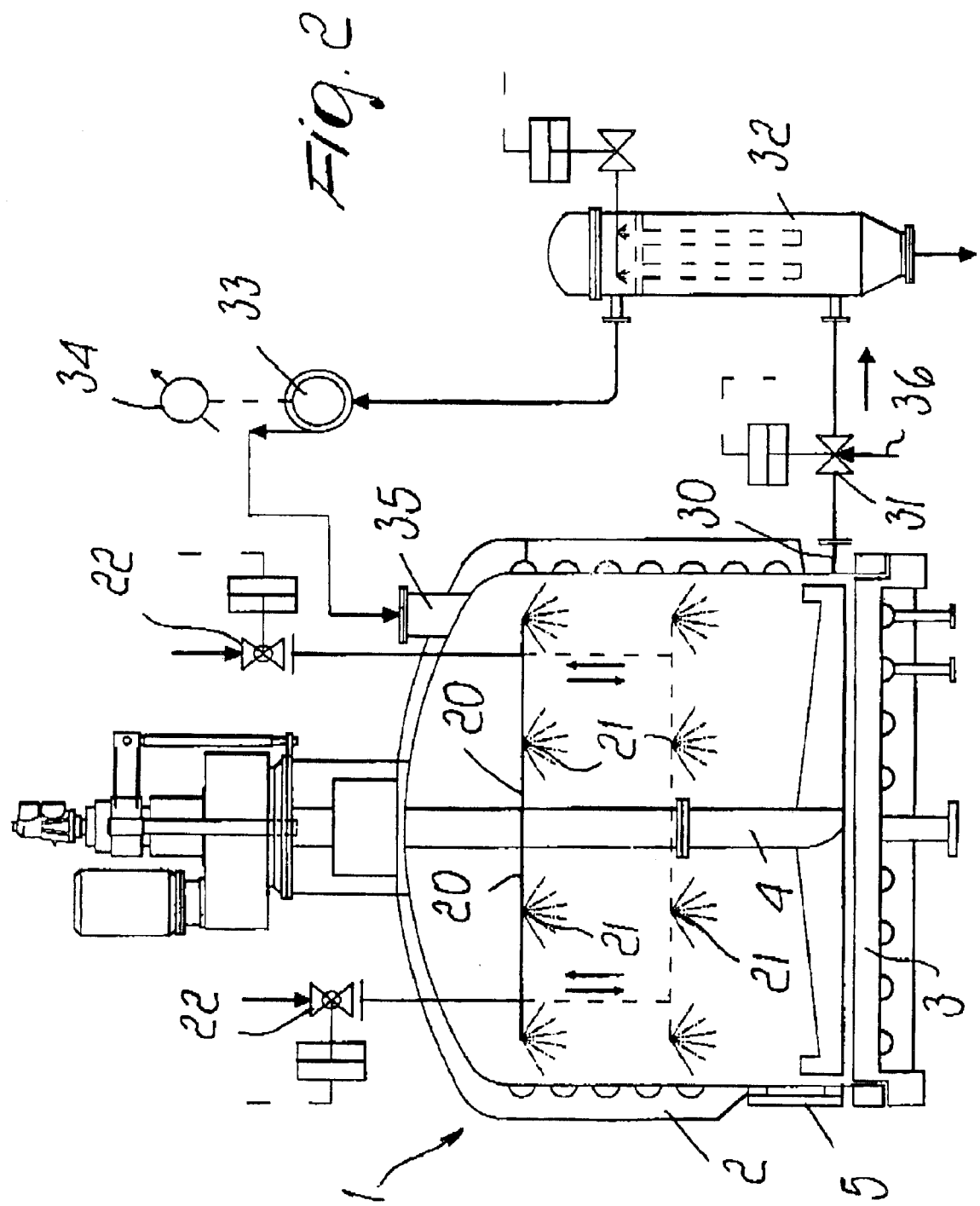
FIG. 2 is a view of a container in which the means for introducing movement fluid are constituted by tori.

With reference to the figures, a container is illustrated which is generally designated by the reference numeral 1 and is constituted, in a per se known manner, by a hood-like body 2 provided with a bottom 3 that is coupled hermetically to the body 2. In the case of drying filters, a conventional filtering element is provided above the bottom.

Inside the container for treating and containing dried product 1 there is an agitator 4, which is actuated also during the discharge of the dried product to a level at which it does not make contact with the bottom or with the optional filtering element.

It is also possible to provide a hatch 5 for discharging the dried product until the agitator arrives proximate to the bottom or the filtering element.

The particularity of the invention consists in providing fluid introducing means for introducing a fluid for moving or circulating the bottom residue of the dried product which, as shown in FIG. 1, are constituted by a plurality of balls 10 and/or rotating elements connected to input valves 11 that regulate the inflow of a fluid, generally an inert gaseous substance, which produces an adequate turbulence in the dried product that lies below the region that can be reached by the agitator 4.

In a different embodiment, the balls 10 can be replaced with tori 20, constituted by one or more annular elements provided with nozzles 21 which are also connected to delivery valves, designated by the reference numeral 22, for the controlled injection of a gaseous substance.

Figure 3:
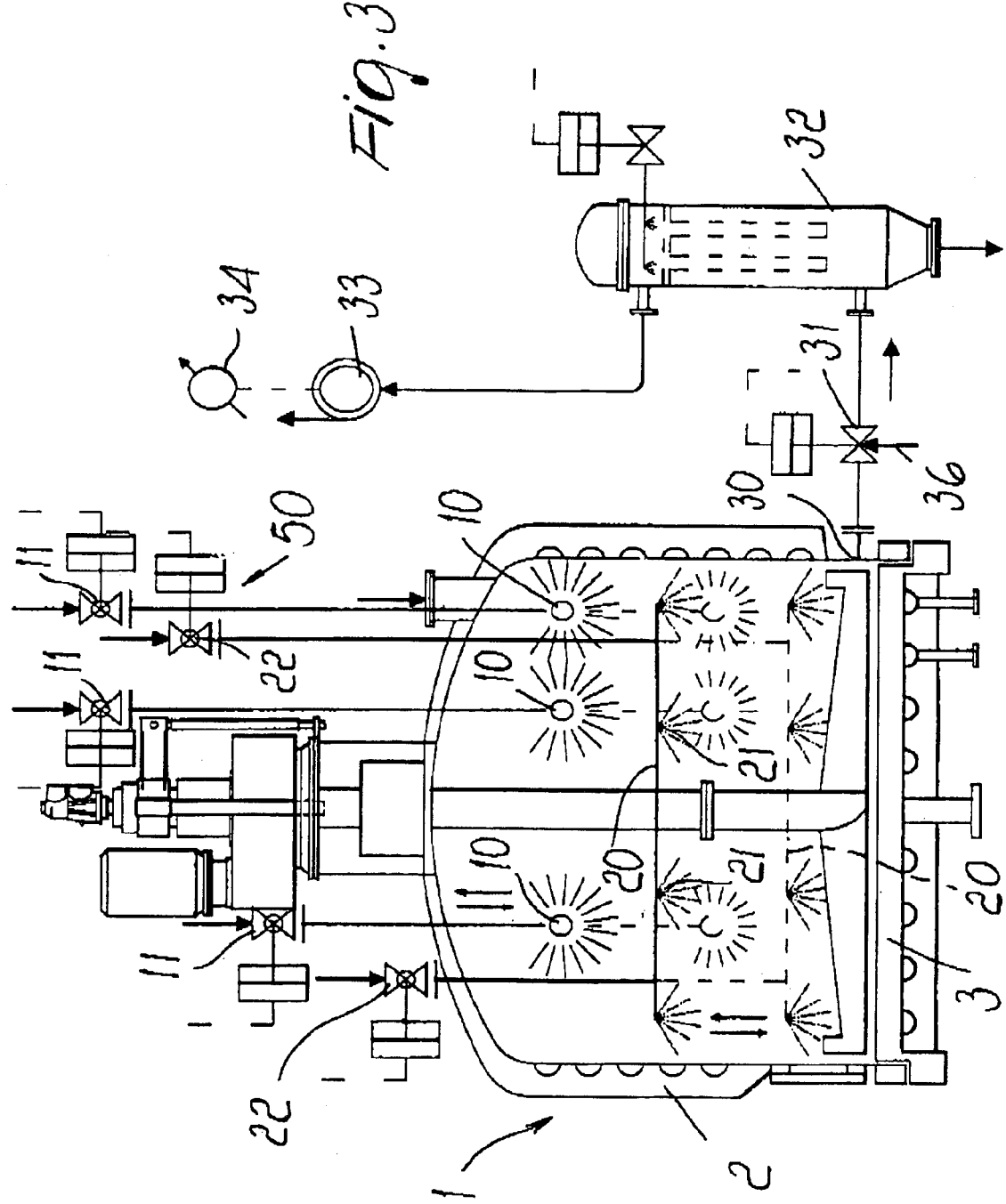
FIG. 3 is a view of a container in which the means for introducing movement fluid are constituted by a combination of tori and balls.

Advantageously, as shown in FIG. 3, it is possible to provide a combined system in which both the balls 10 and the tori 20 are provided.

The fluid introducing means for introducing the movement fluid are connected to vertical translational motion means (50), so that they are lifted during the initial steps of the process inside the drying filter or drying unit, during which the product, dissolved in a liquid, is introduced in order to separate it.

The fluid introducing means are arranged in the upper part to prevent them, during the treatment step, i.e., the filtration, washing and drying step, from being struck by the product, with the possibility of clogging the various nozzles.

According to a different embodiment, the fluid introducing means for introducing the movement fluid are constituted by fixed nozzles arranged in the upper part of the treatment chamber formed inside the container.

Figure 4:
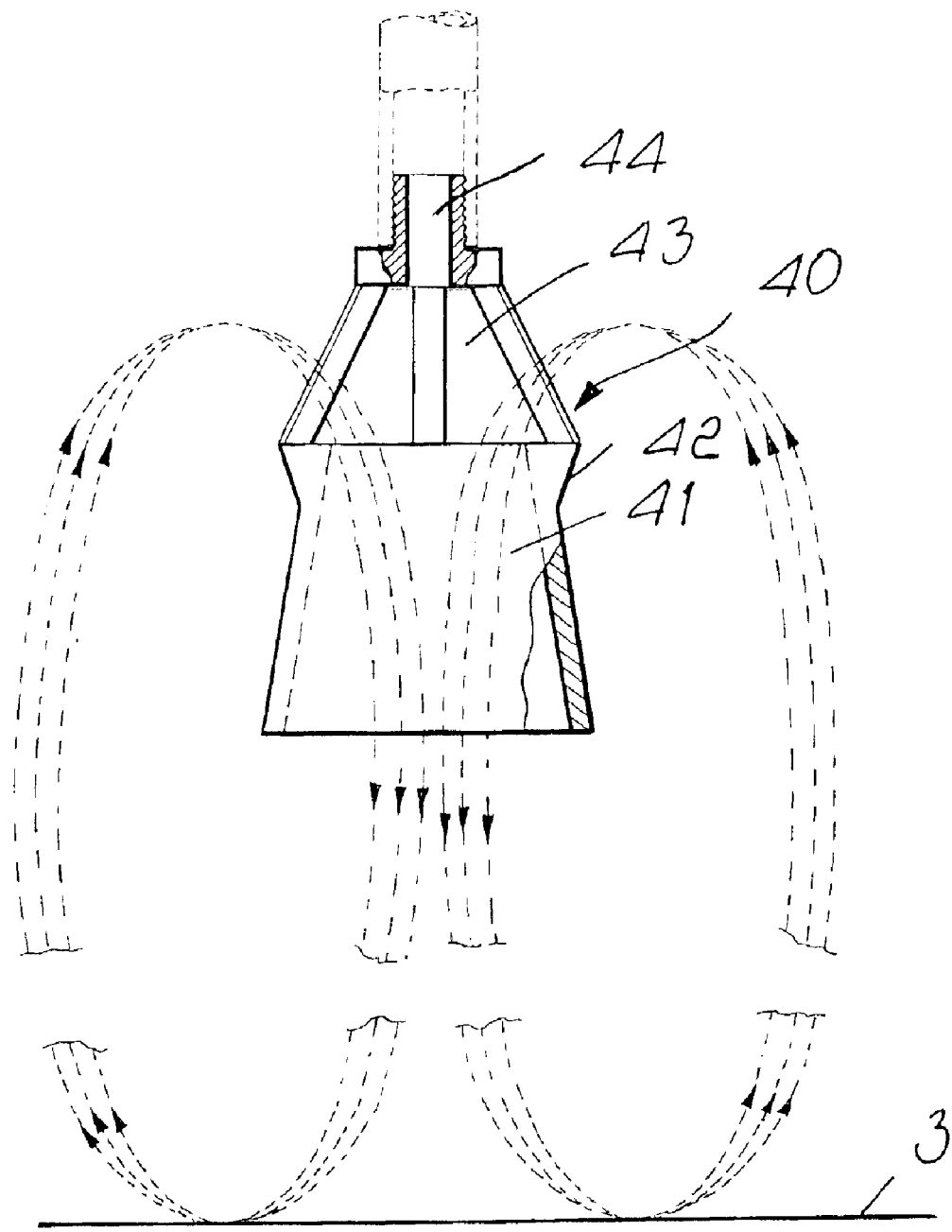
FIG. 4 is a view of a particular embodiment of a nozzle.

As shown in FIG. 4, it has been found experimentally that by using a nozzle 40 having a lower portion 41 shaped like a frustum, that widens at the free end and is connected to an upper frustum-shaped portion 42 that widens at an end or side opposite to the free end of portion 41 toward openings 43, it is possible to produce a continuous circulation of the gaseous substance. A calibrated air intake port 44 is provided in the upper coupling part above said openings.

This type of nozzle is currently used to agitate liquids contained in tanks and before now it was not used to produce air recirculation.

In order to allow the outward expulsion of the product, in the container 1, preferably proximate to the bottom, there is a discharge port 30, which is controlled by a discharge valve 31 interposed on a pneumatic circuit that produces a circulation of a fluid, generally a gaseous fluid, in the direction for flowing out of the container.

For this purpose, downstream of the discharge valve 31 there is a bag filter 32, which is connected to a fan 33 and/or compressor driven by a motor 34 which feeds to recirculation a fluid that can be returned into the container by means of a recirculation delivery port 35.

Pneumatic circulation can be achieved both by applying pressure inside the container, so as to loosen and lift the product, and by using vacuum for evacuation; the pressure and the vacuum can be used either individually or selectively in combination; moreover, to facilitate circulation it is possible to provide an injection inlet 36 for a conveyance fluid downstream of the discharge valve in order to generate a Venturi effect.

The pressure for evacuation can be generated from above, from below, tangentially with respect to the bottom or tangentially with respect to the filtering element, and likewise the pressure can be applied also optionally from below in combination with an action from above.

With the arrangement described above it is thus possible to provide a method suitable to empty the dried product completely, utilizing a movement of the product that constitutes the product residue that is obtained by introducing a gaseous substance by way of suitable nozzles that produce, in practice, a stream for conveying the product outward.

It should be added to the above that it is possible to utilize pneumatic conveyance also to empty the container without performing preliminary emptying by means of the hatch, but by performing complete emptying with an initial step of pneumatic conveyance and a final step with pneumatic conveyance that also allows to remove the product left on the bottom.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2001A001351 from which this application claims priority are incorporated herein by reference.

What is claimed is:

1. An emptying unit for recovering bottom residue in drying units comprising: a container, having a flat bottom, for treating and containing dried product; an agitator, located inside the container, which is actuated during the discharge of the dried product to a level at which it does not make contact with the bottom of the container; fluid introducing means provided at said container for introducing a fluid thereinside for moving bottom residue of the dried product; a discharge port provided at said container; a pneumatic circuit connected to said discharge port and suitable to produce fluid circulation in output from said discharge port, a discharge valve for controlling fluid flow in output from said discharge port, said valve being interposed on said pneumatic circuit, wherein said fluid introducing means are constituted by nozzles arranged in the upper part of the treatment chamber formed inside the container and substantially directed towards the bottom part of said container to create adequate turbulence in the dried product that lies below the region that can be reached by the agitator so as to loosen and lift the product, said loosened and lifted product being discharged through said discharged port under the action of said pneumatic circuit.

2. The emptying unit of claim 1, wherein said discharge port is arranged proximate to a bottom part of said container.

3. The emptying unit of claim 1, wherein said fluid introducing means for introducing a fluid for moving the bottom residue comprise a plurality of injection valves that control fluid inflow and corresponding balls and rotating elements that are operatively connected to said injection valves.

4. The emptying unit of claim 1, wherein said fluid introducing means for introducing a fluid for moving the bottom residue comprise at least one delivery valve for controlling the injection of a fluid and at least one annular element, which is provided with a plurality of nozzles for introducing a fluid, said at least one annular element being operatively connected to said at least one delivery valve.

5. The emptying unit of claim 1, wherein said fluid is constituted by an inert gaseous substance.

6. The emptying unit of claim 4, further comprising vertical translational motion means for lifting said fluid introducing means during initial processing inside the container which are connected to said fluid introducing means.

7. The emptying unit of claim 1, wherein said fluid introducing means for introducing a movement fluid comprise nozzles which are arranged in a fixed position in said container.

8. The emptying unit of claim 7, wherein said nozzles comprise each a calibrated intake port, fluid openings, a lower frustum-shaped portion that widens toward a first free end thereof, and an upper frustum-shaped portion, connected to a second end of said lower frustum-shaped portion, said upper frustum-shaped portion widening on a side thereof opposite to said second side of the upper frustum-shaped portion toward the openings arranged below said calibrated air intake port.

9. The emptying unit of claim 1, further comprising, downstream of said discharge valve, a bag filter, any of a fan and compressor for pressure fluid generation, and a motor for driving said fan or compressor, and an injection inlet for injecting extracted fluid for recirculation.

10. The emptying unit of claim 9, wherein said fan or compressor are provided so as to impart a pneumatic circulation of the bottom residue performed by generating fluid pressure inside said container.

11. The emptying unit of claim 1, wherein said fluid circulation is achieved by producing a vacuum at said discharge valve.

12. The emptying unit of claim 10, wherein said pneumatic circulation is obtained from a combined action of fluid pressure inside said container and a vacuum action provided by vacuum downstream of said container.

13. The emptying unit of claim 1, further comprising an inlet provided at said discharge valve for injection of a gaseous substance adapted to produce a Venturi effect.

* * * * *